US010452637B1

(12) United States Patent
Jones et al.

(10) Patent No.: US 10,452,637 B1
(45) Date of Patent: Oct. 22, 2019

(54) MIGRATION OF MUTABLE DATA SETS BETWEEN DATA STORES

(71) Applicant: Amazon Technologies, Inc., Seattle, WA (US)

(72) Inventors: Shawn Jones, Vancouver (CA); Eric Samuel Stone, Seattle, WA (US); Mingzhe Zhu, Burnaby (CA); Kunal Chopra, Vancouver (CA); Benjamin Jeffery, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 15/253,693

(22) Filed: Aug. 31, 2016

(51) Int. Cl.
*G06F 17/30* (2006.01)
*G06F 16/23* (2019.01)
*G06F 16/21* (2019.01)

(52) U.S. Cl.
CPC ........ *G06F 16/2343* (2019.01); *G06F 16/214* (2019.01)

(58) Field of Classification Search
CPC combination set(s) only.
See application file for complete search history.

(56) References Cited

U.S. PATENT DOCUMENTS

| 7,107,421 | B2 * | 9/2006 | Kaneda | G06F 3/0622 |
| | | | | 711/162 |
| 7,263,590 | B1 | 8/2007 | Todd et al. | |
| 7,571,168 | B2 | 8/2009 | Bahar et al. | |
| 7,707,186 | B2 * | 4/2010 | LeCrone | G06F 3/0617 |
| | | | | 707/656 |
| 9,086,811 | B2 * | 7/2015 | Dudgeon | G06F 3/0619 |
| 9,323,664 | B2 * | 4/2016 | Yu | G06F 12/0246 |
| 9,519,675 | B2 | 12/2016 | Specht et al. | |
| 10,013,316 | B2 * | 7/2018 | Cadarette | G06F 11/00 |
| 2010/0077013 | A1 * | 3/2010 | Clements | G06F 17/30156 |
| | | | | 707/822 |
| 2011/0113259 | A1 * | 5/2011 | Bilodi | G06F 21/606 |
| | | | | 713/193 |
| 2013/0275378 | A1 * | 10/2013 | Mashtizadeh | G06F 3/0617 |
| | | | | 707/640 |
| 2016/0335278 | A1 * | 11/2016 | Tabaaloute | G06F 17/30088 |

* cited by examiner

*Primary Examiner* — Debbie M Le
(74) *Attorney, Agent, or Firm* — Robert C. Kowert; Meyertons, Hood, Kivlin, Kowert & Goetzel, P.C.

(57) ABSTRACT

Migration of mutable data sets between data stores may be implemented. Multiple data sets may be stored at a source data store. Some of the data sets may be identified for migration to a destination data store. Updates to the identified data sets may be blocked while the identified data sets are copied from the source data store to the destination data store. In some embodiments, the copies of the data sets at the destination data store are validated. Updates to the data sets may then be allowed at the destination data store instead of the source data store.

20 Claims, 9 Drawing Sheets

MIGRATION OF MUTABLE DATA SETS BETWEEN DATA STORES

BACKGROUND

Data stores offer different characteristics and capabilities when maintaining data on behalf of clients. Clients of data stores, including various kinds of systems or services, may rely upon such characteristics and capabilities in order to support the performance of different operations or tasks. As the performance requirements of the operations or tasks change, changes to the data store may become necessary, including migrating data stored at one data store to another, in order to support the changed performance requirements.

Migrating data between data stores is not performed without cost. Adaptations to the operation of the client system or service may need to be implemented in order to configure the client system or service to interact with a different data store. Moreover, the migration of the data may result in client system or service downtime in order to preserve consistency of data that is being migrated. Such costs may become prohibitive to migration, even in scenarios where great improvements to the client system or service can be achieved.

Figure 1:
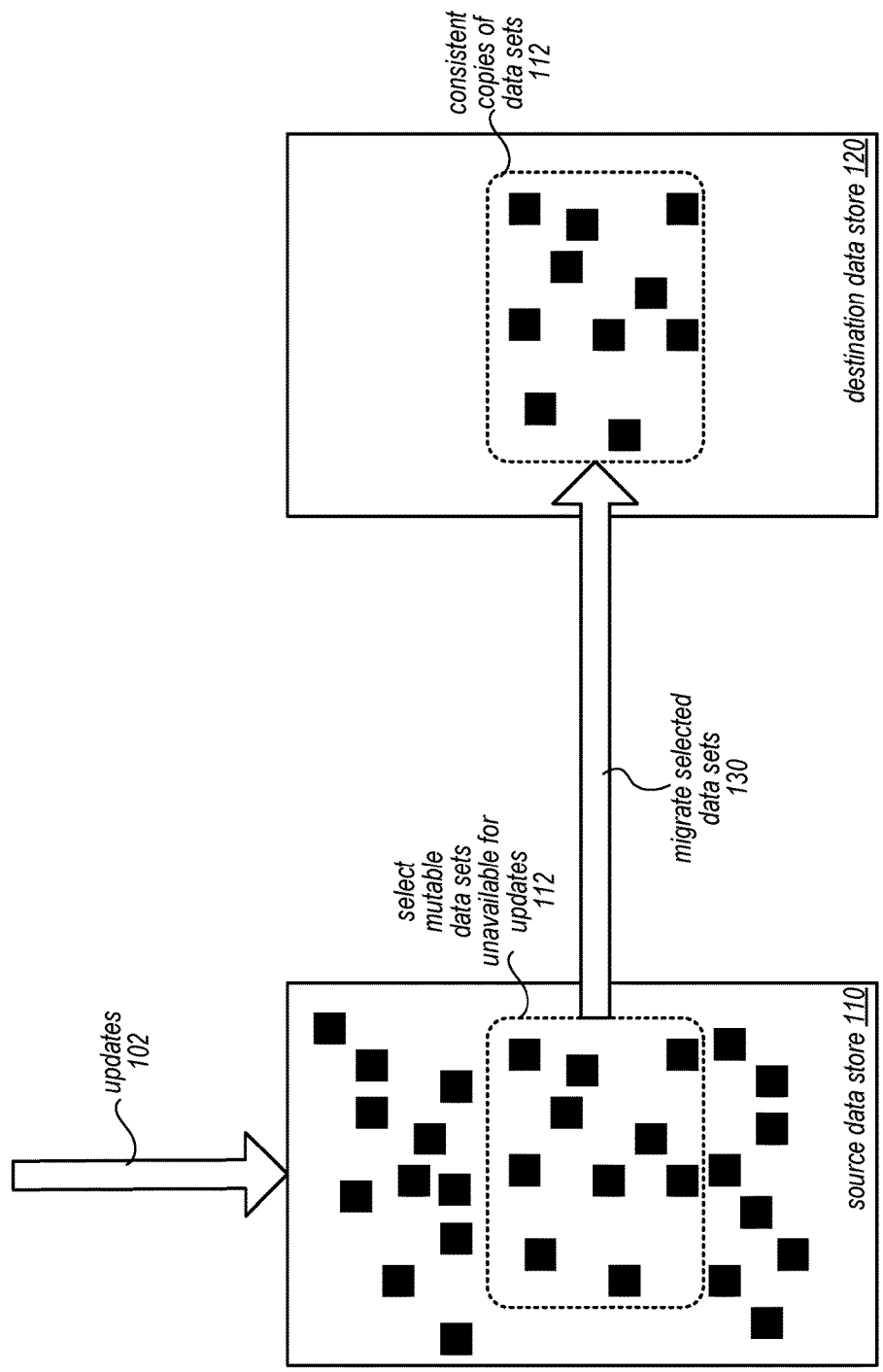
FIG. 1 is a logical block diagram illustrating migration of mutable data sets between data stores, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of migration of mutable data sets between data stores are described herein. Storage schemas, architectures, implementations, and other components of a data store affect the performance or capabilities of those clients that rely upon the data store to store data used in various operations or tasks. For example, back-end data stores may serve as repositories for content that is displayed on a network-based site (e.g., a website accessible via the internet). Because data stores offer varying capabilities, the selection of one data store for storing data over another may be depend on the capabilities that a client of the data store requires. As client needs change, or performance degrades as a result of ageing data store hardware, it may be beneficial for a change in the data store hosting data utilized by the client to be enacted in order to take advantage of a different data store's capabilities. However, data migrations for clients (such as those clients that can tolerate little downtime) are often caught between the desire to perform data migration and the costs in terms of downtime or other disruption that may occur as a result of the migration. Mutable data (e.g., data that can be changed) is particularly sensitive to migrations as changes to data could occur while migration of the data takes place.

As the amount of data to migrate increases, the costs of disruption grow, making it difficult to perform migrations when large amounts of data are involved. For example, large scale systems or services that maintain large amounts of data in data stores may have to accept widespread service outages or downtime in order to perform migrations, making it unlikely that such migrations will be performed. However, migrating mutable data sets between data stores in a manner that ensures minimal disruption could allow for the migration of data (even large amounts of data) within cost or disruption tolerance threshold. FIG. 1 is a logical block diagram illustrating migration of mutable data sets between data stores, according to some embodiments. Data sets may be maintained in a data store, such as source data store 110. Data sets may be one or more data objects or collections of data objects (e.g., files, folders, tables, volumes, pages, blocks, or other forms or formats of data including various data structures) which may be treated for migration purposes as an atomic unit (e.g., migrated together or not migrated at all). In order to migrate the data sets stored in source data store 110 to a different data store, such as destination data store 120, migration of mutable data sets may be incrementally performed so that clients suffer minimal disruption.

Figure 6:
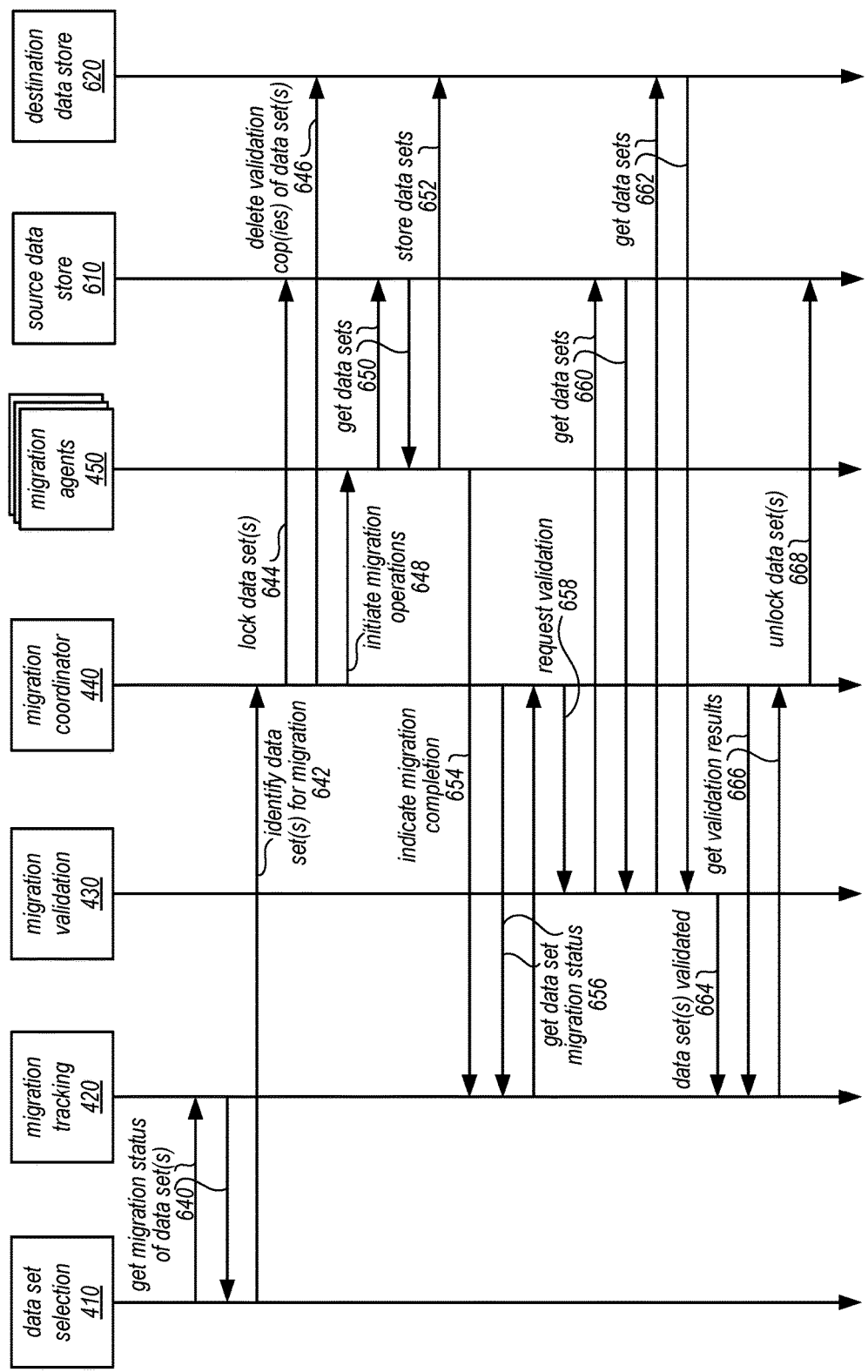
FIG. 6 is a sequence diagram illustrating migration of select mutable data sets from one data store to another data store directed by a migration service, according to some embodiments.
Figure 7:
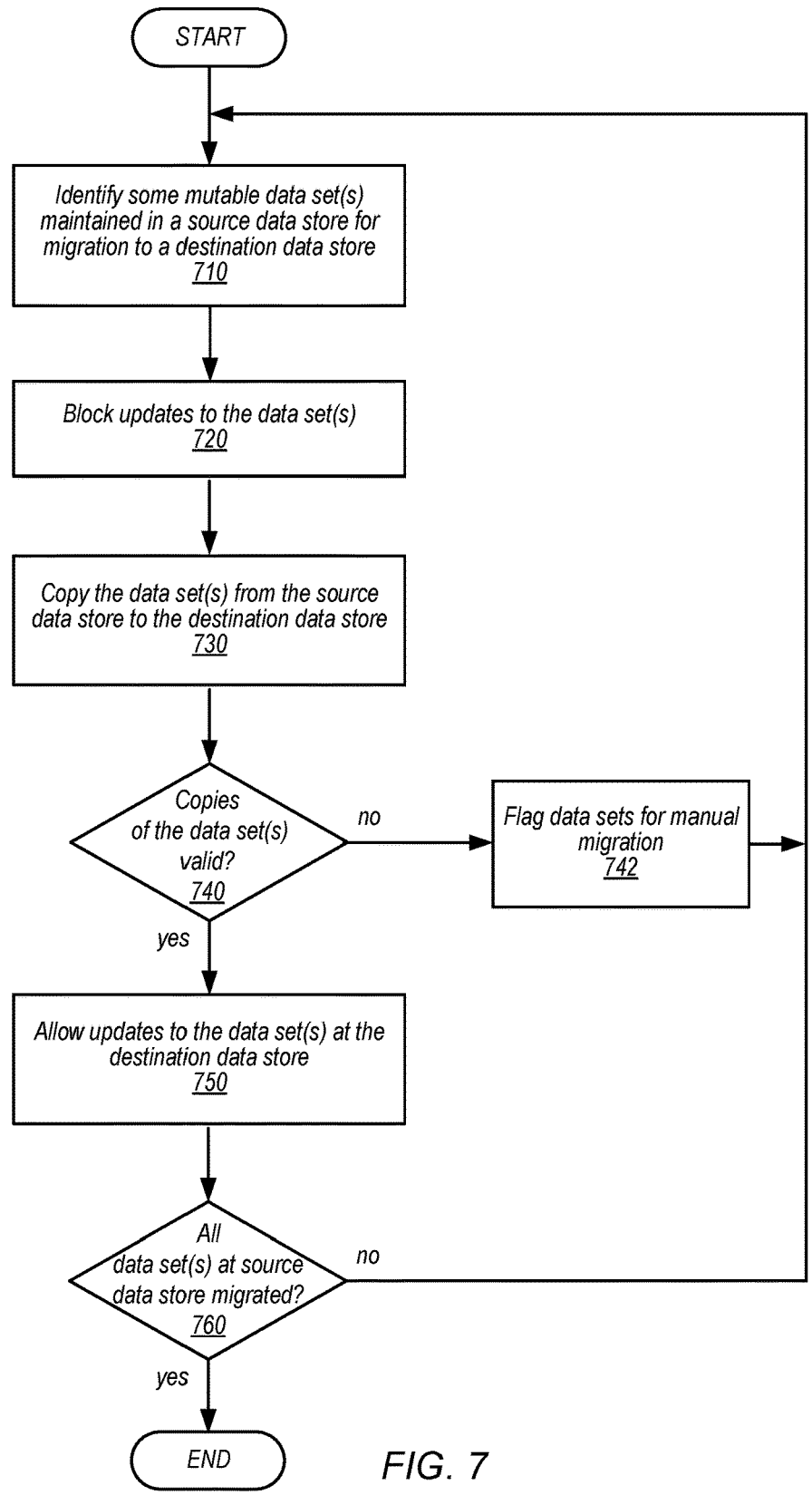
FIG. 7 is a high-level flowchart illustrating methods and techniques to migrate mutable data sets between data stores, according to some embodiments.

For instance, the data sets in source data store 110 may be accessible for updates 102, and thus are mutable. Because the data sets may be changed by updates 102, scenarios may occur where changes could be made to portions of the data sets after the data sets are copied to destination data store 120, creating an inconsistent version of the data sets at the destination data store 120. Instead, as illustrated in FIG. 1, a subset of all of the data sets maintained at source data store 110, only a select number of mutable data sets 112, may be migrated at a time, blocking updates 102 to the select mutable data sets 112 while allowing updates 102 to remaining data sets not undergoing migration 130. In this way, the select mutable data sets 112 may be copied to create consistent data set copies 104 in destination data store 120 without the potential for changes to the data sets occurring that are not copied to destination data store 120. FIGS. 6 and 7, discussed below, provide different examples of such incremental migration techniques that block updates to data sets undergoing migration. Moreover, because only a portion of the data sets are being migrated, client disruption is limited to the selected mutable data sets 112 and may be even further limited as read or other access that does not modify the data sets 112 may still be allowed.

Figure 2:
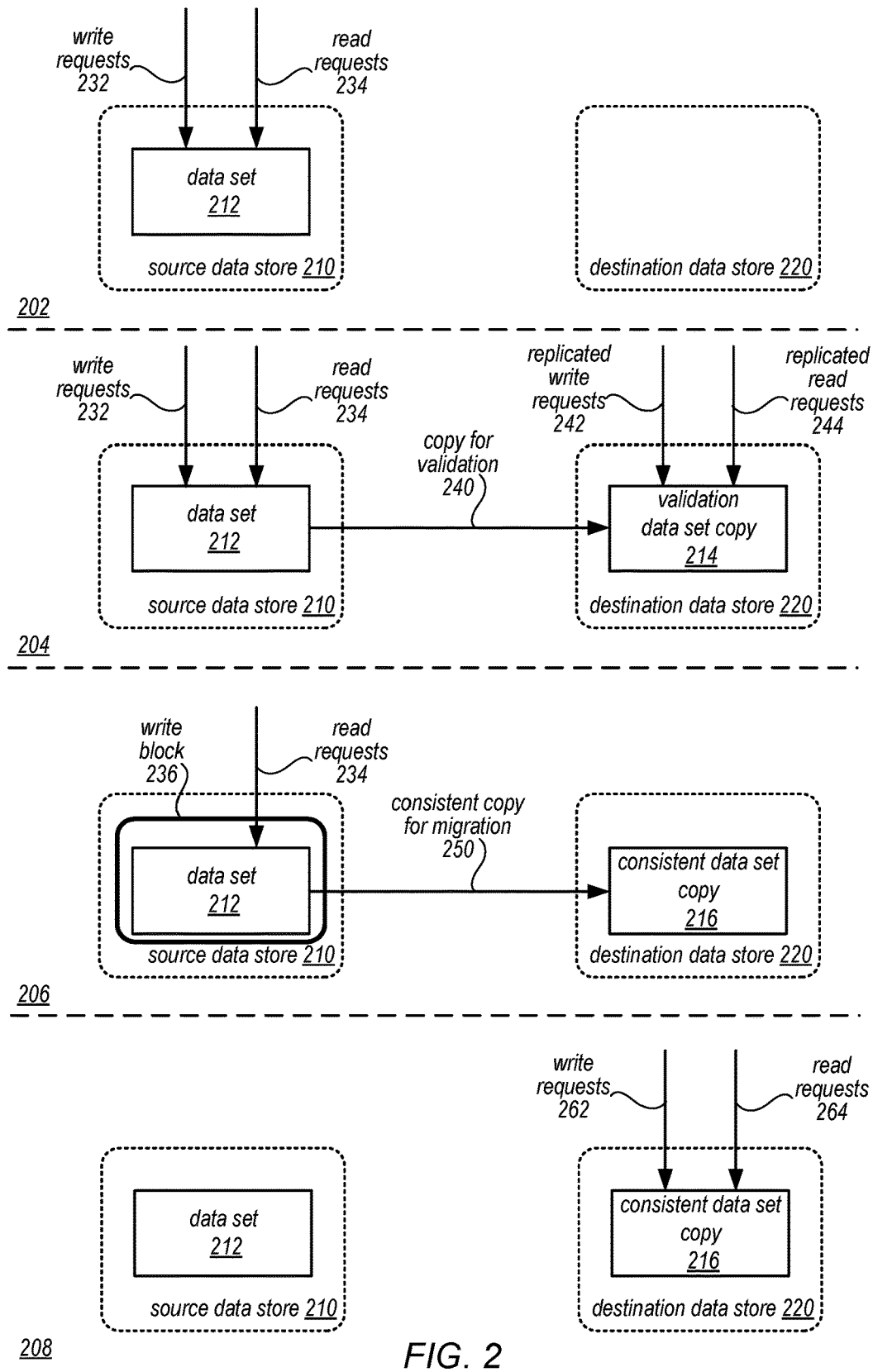
FIG. 2 is a series of logical block diagrams illustrating different phases of migrating mutable data sets between data stores, according to some embodiments.

Migration of data sets from one data store to another may have unforeseen consequences. For example, while the interfaces of a source data store and a destination data store may be similar enough so that little to no changes are made to clients that access data sets that are migrated, the underlying implementation or operation of the different data stores may result in different behavior or performance. The impact of this performance change may be predicted but not fully understood when determining whether to migrate data sets between data stores. Performing migration of data sets in phases may allow for the unpredicted changes or results of a migration to be discovered with little client impact. FIG. 2 is a series of logical block diagrams illustrating different phases of migrating mutable data sets between data stores, according to some embodiments.

As illustrated in scene 202, an original state of a data set being maintained for access in a data store is depicted. Data set 212 is made available to write request 232 and read requests 234 at source data store 210. Destination data store 220 may represent a potential location to store data set 212. Upon a determination to migrate data set 212 to destination data store 220, a validation phase may be performed prior to migration, as illustrated in scene 204. In a validation phase, a copy for validation 240 is performed so that validation data set copy 214 of data set 212 is stored in destination data store 220. Note that during the copy for validation 240, write requests 232 and read requests 234 to data set 212 may still be performed, thus the validation copy 214 may not be consistent as changes to data set 212 may be made after the copy 240 but not replicated to validation data set copy 214. However, validation data set copy 214 may still be utilized for validation purposes. Thus, replicated write requests 242 and replicated read requests 244 may be accepted at validation data set copy 214 in order to compare the results (as discussed below with regard to FIGS. 5B and 8). In this way, the performance of destination data store 220 may be compared with source data store 210 in order to determine whether migration of data set 212 should proceed or should be halted for further investigation (e.g., in the event of errors identified when comparing results). For example, an error threshold may be implemented so that if validation errors occurring as a result of replicating write 242 and read requests 244 are less than the error threshold, the migration phase described below in scene 206 may be automatically performed (without a manual request or transition to initiate migration).

As illustrated in scene 206, migration of data set 212 to destination data store 220 may be performed by blocking writes 236 so that only read requests 234 are allowed while a copy of data set for migration 250 is made to destination data store 220. For example, in at least some embodiments, a lock or other indicator may be written to data set 212 so that when write requests are attempted, the lock field will indicate that such writes cannot proceed and thus the write requests may be aborted or denied. This consistent data set copy 216 may be consistent with data set 212 as no changes may be made while the data set is copied. Read requests 234 may still proceed without interruption. In at least some embodiments, a validation of consistent data set copy 216 may be performed with respect to data set 212 to ensure that consistent data set copy is consistent. As illustrated in scene 208, upon completion of the migration, write requests 262 and read requests 264 are now processed at destination data store 220 maintaining the consistent data set copy 212. For example, the lock field noted above in data set 212 may be changed to indicate that the data set is now maintained in destination data store 220, so that when attempts to access data set 212 are processed, the lock value may be returned so that subsequent requests are directed to destination data store 220.

Please note, FIGS. 1 and 2 are provided as logical illustrations of migrating mutable data sets between data stores, and are not intended to be limiting as to the physical arrangement, size, or number of components, modules, or devices, implementing a data store or migration of data sets.

The specification first describes an example of a provider network that offers migration of mutable data sets between data stores offered as data storage service(s) in the provider network, according to various embodiments. Included in the description of the example provider network is a migration service that directs various aspects of migrating mutable data sets from one data store to another. The specification then describes flowcharts of various embodiments of methods for migration of mutable data sets between data stores. Next, the specification describes an example system that may implement the disclosed techniques. Various examples are provided throughout the specification.

Figure 3:
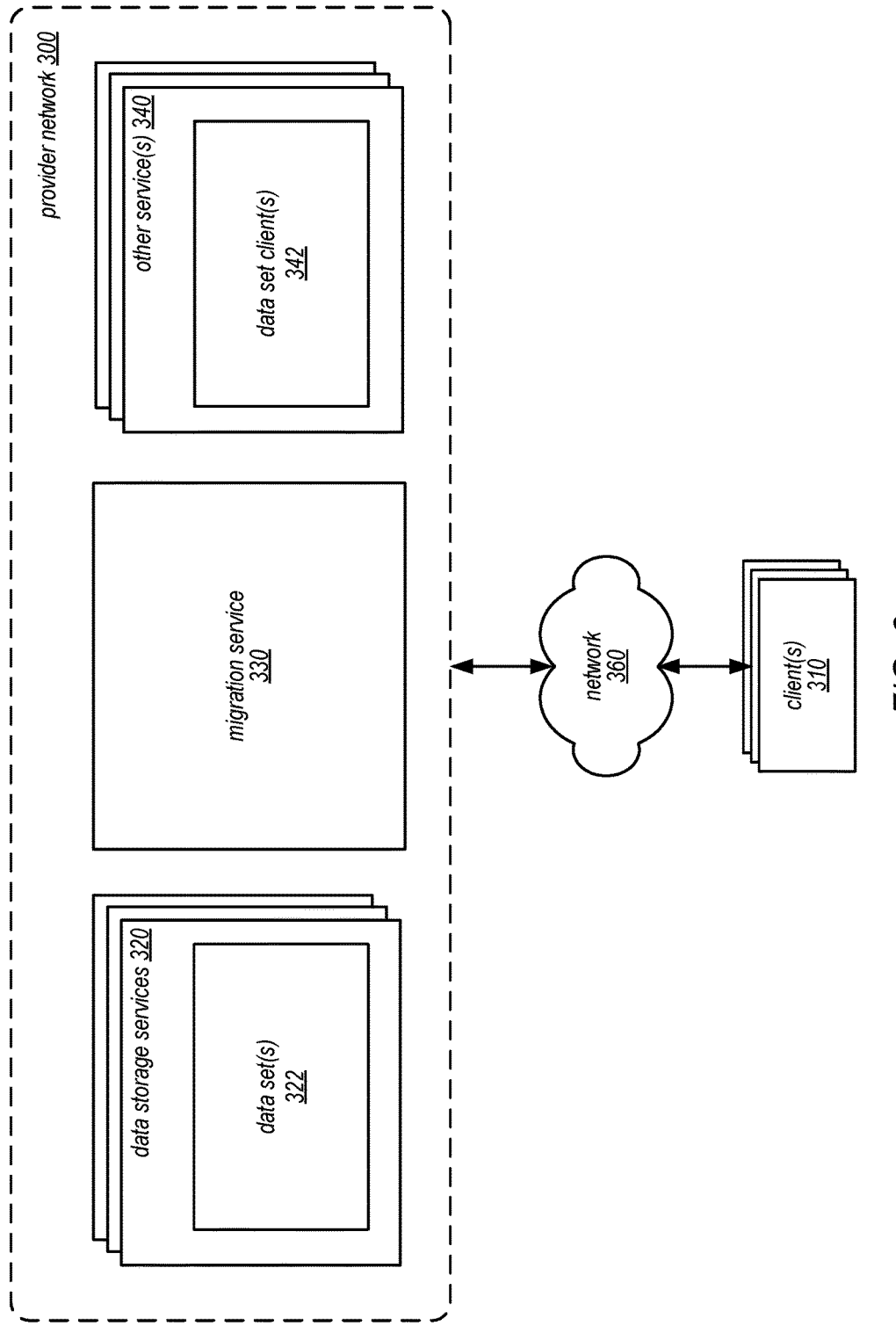
FIG. 3 is a logical block diagram illustrating a provider network that implements data storage services, a migration service, and other services, according to some embodiments.

FIG. 3 is a logical block diagram illustrating a provider network that implements data storage services, a migration service, and other services, according to some embodiments. Provider network 300 may be a private or closed system or may be set up by an entity such as a company or a public sector organization to provide one or more services (such as various types of cloud-based storage) accessible via the Internet and/or other networks to clients 310. Provider network 300 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 300. In some embodiments, provider network 300 may implement various computing resources or services, such as a virtual compute service, data processing service(s), (e.g., map reduce and other large scale data processing services), data storage services (e.g., database services, object storage services, or block-based storage services), and/or any other type of network based services (which may include various other types of storage, processing, analysis, communication, event handling, visualization, and security services).

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 320) may be implemented by a particular node or may be distributed across several nodes. In some embodiments, a given node may implement the functionality of more than one service system component (e.g., more than one data store component).

Data storage service(s) 320 may implement different types of data stores for storing, accessing, and managing data set(s) 322 on behalf of clients 310 or other service(s) 340 as a network-based service that enables clients 310 or other services 340 to operate a data storage system in a cloud or network computing environment. Data storage service(s) 320 may also include various kinds of object or file data stores for putting, updating, and getting data objects or files. Such data storage service(s) 320 may be accessed via programmatic interfaces (e.g., APIs) or graphical user interfaces. Data storage service(s) 320 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI). Data storage service(s) 320 may include various types of database storage services (both relational and non-relational) for storing, querying, and updating data. Such services may be enterprise-class database systems that are highly scalable and extensible. Queries may be directed to a database in data storage service(s) 320 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Other network services 340 may include various types of services that perform processing, analysis, communication, event handling, visualization, security services, and/or any other services provided by computing resources implemented as part of provider network 300. Other service(s) 340 may implement data set client(s) 342 which access data set(s) 322 to perform various operations. For example, other service(s) 340 may include various types of data processing services to perform different functions (e.g., anomaly detection, machine learning, querying, or any other type of data processing operation) upon data set(s) 322 stored in one of data storage service(s) 320. In at least some embodiments, other service(s) 340 may access data set(s) 322 in data storage service(s) 320 as part of performing different actions, functions, tasks, or operations requested by client(s) 310. For example, other services 340 may include computing resource management services that store management or configuration data for client(s) 310 in data set(s) 322. If, for instance, client(s) 310 wish to change the configuration or scheme under which some resources (e.g., virtual compute instances, network controls, or other resources offered by different service(s) 340), then client(s) 310 may submit a request to the computing resource management service that results in the computing resource management service making a change to data set(s) 322 (e.g., changing a scaling policy or security policy for resources that is stored unbeknownst to client(s) 310 in data set(s) 322).

Figure 4:
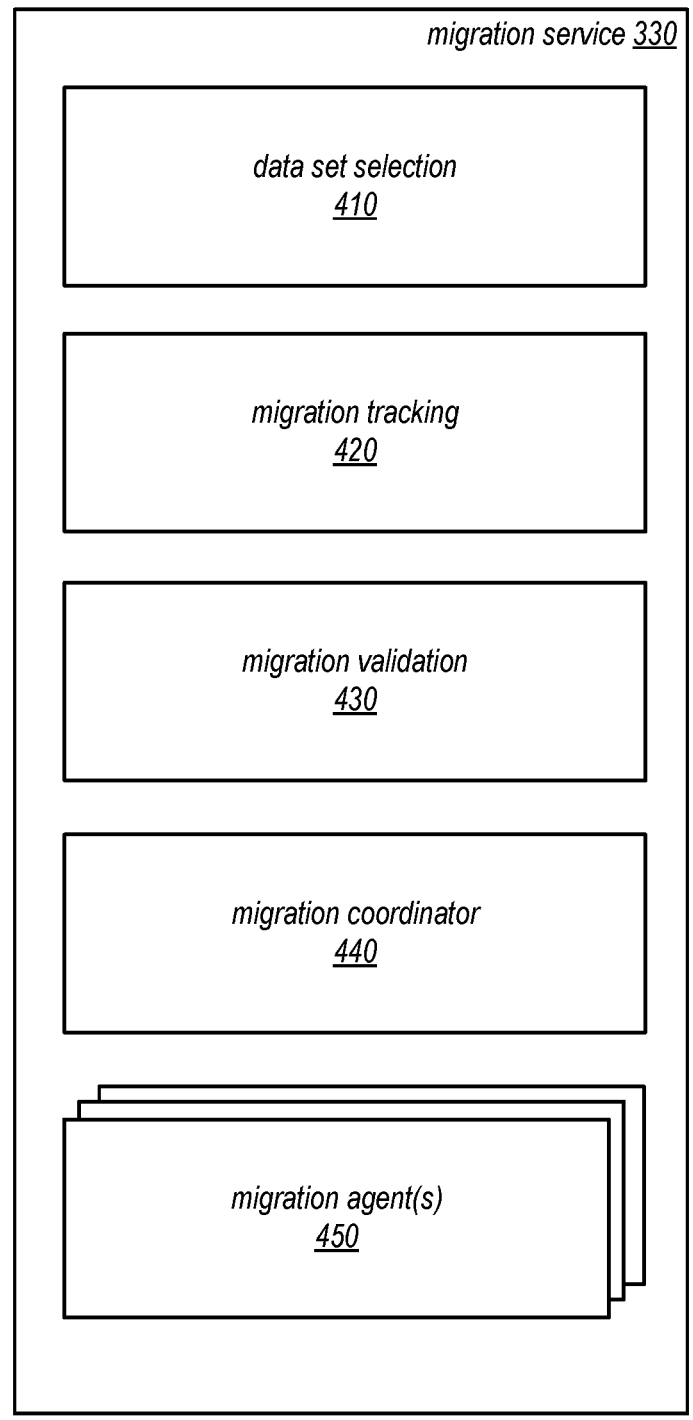
FIG. 4 is a logical block diagram illustrating a migration service that performs migration of mutable data sets between data stores, according to some embodiments.

Different data storage services 320 may offer different capabilities when accessing data set(s) 322. Thus, in at least some embodiments, provider network 300 may implement migration service 330 to direct the migration of data sets from data storage service to another data storage service. Migration service 330 may be implemented to perform data migration in transparent fashion so that client(s) 310 which utilize other service(s) 340 may be unaware of the migration of data set(s) 322. For example, one network-based service implementing data set client(s) 342 may wish to transfer data set(s) 322 to another data storage service in order to take advantage of a different storage type (e.g., data format or schema) offered by the other data storage service (e.g., migrating from a relational database storage schema to a non-relational database storage schema) as part of adding additional features to the operation of the network-based service. However, in other embodiments, client(s) 310 may request the migration of data set(s) 322 (e.g., as offered by a feature of other service(s) 340). FIG. 4 discusses migration service 330 in detail below.

Generally speaking, clients 310 may encompass any type of client configurable to submit network-based requests to provider network 300 via network 360, including requests for storage services (e.g., a request to create, read, write, obtain, or modify data in data storage service(s) 330, etc.). For example, a given client 310 may include a suitable version of a web browser, or may include a plug-in module or other type of code module configured to execute as an extension to or within an execution environment provided by a web browser. Alternatively, a client 310 may encompass an application such as a database application (or user interface thereof), a media application, an office application or any other application that may make use of storage resources in data storage service(s) 330 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 310 may be an application configured to interact directly with provider network 300. In some embodiments, client 310 may be configured to generate network-based services requests according to a Representational State Transfer (REST)-style network-based services architecture, a document- or message-based network-based services architecture, or another suitable network-based services architecture.

In some embodiments, a client 310 may be configured to provide access to provider network 300 to other applications in a manner that is transparent to those applications. For example, client 310 may be configured to integrate with an operating system or file system to provide storage on one of data storage service(s) 320 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 320 may be coordinated by client 310 and the operating system or file system on behalf of applications executing within the operating system environment.

Clients 310 may convey network-based services requests (e.g., access requests directed to data in data storage service(s) 320, or operations, tasks, or jobs, being performed as part of other service(s) 340) to and receive responses from provider network 300 via network 360. In various embodiments, network 360 may encompass any suitable combination of networking hardware and protocols necessary to establish network-based-based communications between clients 310 and provider network 300. For example, network 360 may generally encompass the various telecommunications networks and service providers that collectively implement the Internet. Network 360 may also include private networks such as local area networks (LANs) or wide area networks (WANs) as well as public or private wireless networks. For example, both a given client 310 and provider network 300 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and provider network 300. It is noted that in some embodiments, clients 310 may communicate with provider network 300 using a private network rather than the public Internet.

FIG. 4 is a logical block diagram illustrating a migration service that performs migration of mutable data sets between data stores, according to some embodiments. Migration service 330 may implement data set selection 410, in various embodiments to determine which data set(s) from a source data store should be migrated at a given time. Implementing data set selection 410 may allow for granular and incremental migration of a large number of data sets from one data store to another by intelligently selecting data sets for migration in a way that limits client impact as a result of the migration. For example data set selection 410, may examine usage statistics or other historical data to predict when data sets have off-peak or low utilization to perform migration when client impact is small. In some embodiments, data set selection 410 may implement random selection or determine an order for migrating data sets (e.g., smallest to largest, by identification number, by client, etc.). Data set selection 410 may also be manually directed or configured (e.g., by receiving requests via an interface, either programmatic or graphical) to migrate certain data sets, or migrate the data sets in a certain order. Data set selection 410 may implement controls to limit the impact of migration upon clients accessing the data sets by limiting or capping the number of data sets that may be migrated at any given time. For example, data set selection 410 may not identify data sets for migration until previously identified data sets (which may include a number of data sets up to a migration limit) are either completed or flagged for manual migration/investigation. In various embodiments, data set selection may obtain information from migration tracking 420 to identify or select data sets for migration.

Migration service 330 may implement migration tracking 420 to collect, track, follow, store, and/or maintain information describing migration operations both ongoing and completed for migration service 330. For example, migration tracking may implement a data store including tables to maintain information describing those data sets that have been migrated (e.g., by storing data set identifiers or account identifiers for a provider network that are associated with the data sets), updating a percentile or other metric indicating the progress of migrations for the data store as a whole (e.g., percentile of data sets), track last completed migration (e.g., by data set identifier), current status of the data sets in source data store (e.g., "PAUSED or ERROR DETECTED," "IN PROGRESS," or "COMPLETED"), and location information describing the source and destination of the data sets. Migration tracking 420 may poll other entities in migration service 330 for status updates (e.g., migration validation 430, data set selection 410, migration coordinator 440, or migration agent(s) 450) or may receive and process requests to update or determine status for data sets.

Migration service 330 may implement migration validation 430. Migration validation 430 may perform validation for different phases of migrating data sets. For example, as discussed below with regard to FIGS. 5A, 5B, and 8, migration validation 430 may provide validation of updates and read requests processed against a data set in the source data store and a copy of the data state maintained in the destination data store for validation purposes. Migration validation 440 may also implement various techniques, as discussed below with regard to FIGS. 6 and 7 to validate migrated copies of data sets (e.g., by comparing the contents of the copies with the data sets in the source data store).

Migration service 330 may implement migration coordinator 440 to direct the migration of identified data sets from a source data store to a destination data store. Migration coordinator 440 may obtain the necessary access credentials, configure the appropriate interfaces, and perform various other tasks to facilitate the copying of data from one data store to another. In at least some embodiments, migration coordinator 440 may assign migration operations to migration agents 450, directing the copying of individual data objects or portions of a data set by different migration agents. In this way, data sets may be migrated in parallel by multiple migration agents 450. Migration service 330 may implement migration agent(s) 450 to perform migration operations. Migration agent(s) 450 may be implemented as part of a pool of reserved computing resources that may be provisioned for the migration of data sets by migration coordinator 440.

Figure 5A:
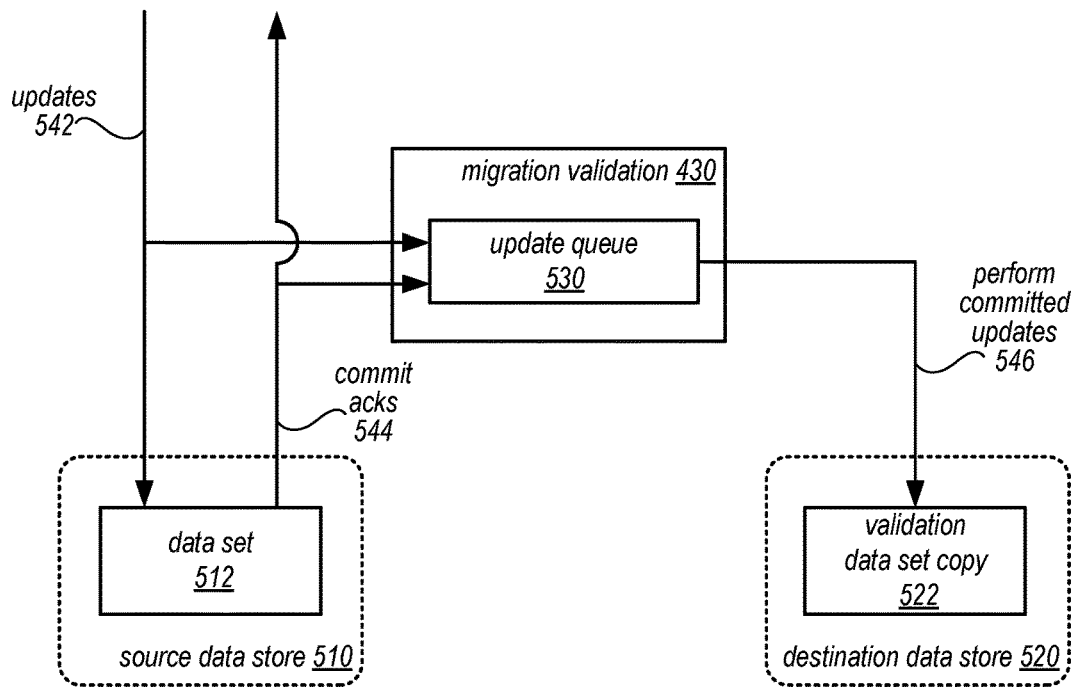
FIGS. 5A and 5B are logical block diagrams illustrating performing updates and reads upon a validation copy of a data set at a destination data store, according to some embodiments.

As discussed above with regard to FIG. 2, migration of data sets from one data store to another is not without some risk. Automated techniques, like those discussed below with regard to FIGS. 6 and 7, may not account for unintended consequences inherent in storing data sets in a different data store. For instance, latency patterns or behavior for clients may change or the data set itself may become corrupted or fail to change or respond to access requests in the same way as a prior data store. A validation phase that provides a trial run of hosting a copy of the data set for validation in the prospective destination data store may provide insight into whether the migration of data sets to the destination data store is beneficial in a way that satisfies prior expectations. The validation may be performed asynchronously so that the data path of updates and reads between a client and the data set in the source data store is not interrupted and can be performed synchronously. FIG. 5A is a logical block diagram illustrating performing updates upon a validation copy of a data set at a destination data store, according to some embodiments.

Data set 512 may be maintained in source data store 510. A copy of data set 512 may be made and stored as validation data set copy 522 in destination data store 520. Migration validation 430 may coordinate the asynchronous performance of access requests (e.g., updates 542 or reads 552 in FIG. 5B) with respect to the validation data set copy 522 in order to determine validation results 560. As updates 542 are received to update data set 512 in source data store 510, the updates 542 may also be maintained in update queue 530 implemented as part of migration validation 430 (or another system, component, or device). Updates 542 may be performed as one or multiple updates that are part of a transaction. The transaction (or individual updates 542 not part of a transaction) may be either committed or not committed at source data store 510. When a transaction is committed, the acknowledgement 544 may be provided to the client as well as to migration validation.

Update queue 530 may preserve updates 542 until the updates are committed (as part of a transaction or individually) by data store 510, after which they may be de-queued and performed 546 with respect to the validation data set copy 522 in 520. Updates or transactions that do not commit, may not be performed and may be periodically removed from update queue 530 in order to ensure that update queue is not filled with updates not performed. By only performing committed updates, updates not performed/committed at data store 510 will not have to be rolled back or undone at destination data store 520. In at least some embodiments, version numbers for updated data objects may be included in the updates (or transactions) maintained in update queue 530 and maintained in validation data set copy 522 in order to ensure that updates or transactions are not applied to validation data set copy 522 out of order.

Figure 5B:
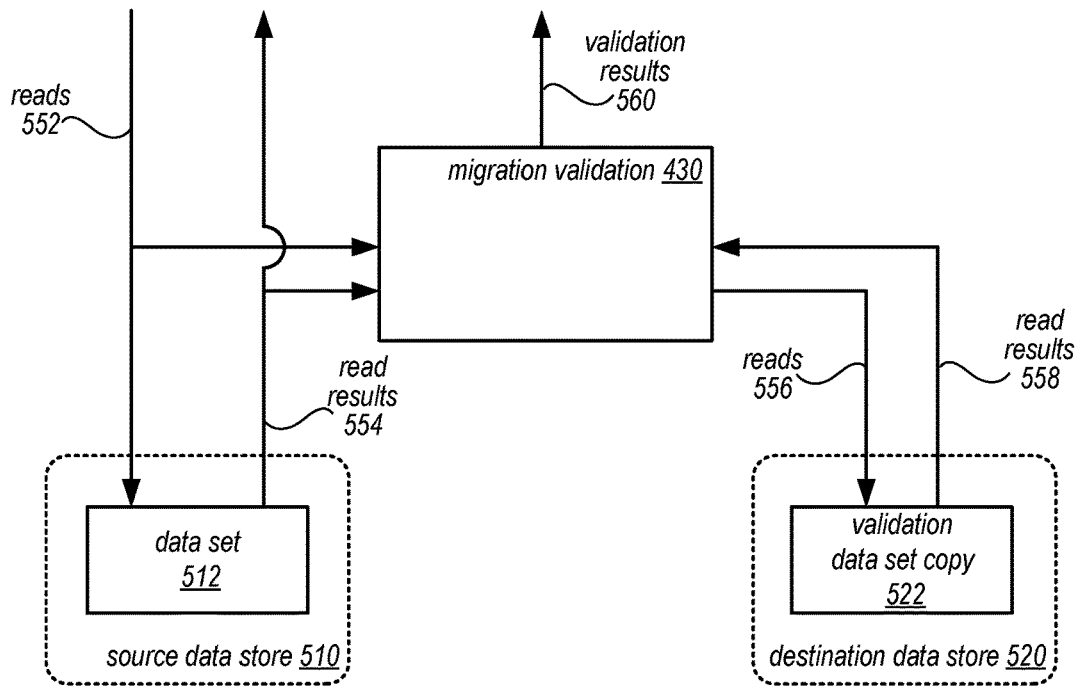

As committed updates 542 to data set 512 are eventually performed at validation data set copy 522, validation data set copy 522 may be utilized to perform analyses as to whether reading from a copy of the data set in destination data store 520 provides expected or desired performance. FIG. 5B is a logical block diagram illustrating performing reads upon a validation copy of a data set at a destination data store in order to determine validation results, according to some embodiments. Reads 522 may be received at source data store 510 that are directed to data set 512. The reads may also be provided to migration validation 430 which may direct the same read request 556 to destination data store 520. Both data stores 510 and 520 may generate read results 512 and 558 respectively which may be provided to migration validation 430. Migration validation 430 may then compare the results for errors (e.g., missing data, different data values, etc.) and provide validation results 560.

Validation results 560 may be stored, compiled, aggregated, and/or otherwise made available to operators or other stakeholders that may determine whether migration should proceed. For example, transition between a validation phase and a migration phase may be triggered automatically by evaluating validation results 560 to determine whether migration of the data sets from the source data store should proceed. Various different thresholds, criteria, or other analyses may be specified in order to trigger automatic migration. For instance, the frequency of occurrence for certain validation errors (e.g., where requested data does not exist or the results returned from the source and destination data store do not match) may be compared with threshold(s). If the frequency of error(s) remains under the threshold(s) for a particular length of time, then a migration event triggering the migration phase may be detected. In some instances, validation result 560 may also trigger manual evaluation events or notifications so that operators, clients, or other stakeholders involved with the migration may be able to perform manual analysis of validation errors. If such manual analysis concludes that migration is still beneficial, then a manual request to proceed to the migration phase may be received and trigger the migration of the data sets from the source data store to the destination data store.

Upon completion of a validation phase (or without performing a validation phase), migration service 330 may direct the migration of mutable data sets stored in a source data store to a destination data store. FIG. 6 is a sequence diagram illustrating migration of select mutable data sets from one data store to another data store directed by a migration service, according to some embodiments. For example, data set selection 410 may access tracking or state information maintained by migration tracking 420 to get the migration status of data sets that are maintained in the source data store. For example, migration tracking 420 may maintain a list of data sets in source data store that have not yet been migrated. Data set selection 410 may select data set(s) for migration and identify those data set(s) 642 to migration coordinator 440.

Migration coordinator 440 may determine and/or collect the information to perform the migration, including identification of the destination data store 620 (or locations, identifiers, or other information for storing the data set(s)). Migration coordinator may initiate migration by locking the data set(s) 644 at source data store 610. For example, migration coordinator 440 may write or store a lock field or object in the data set(s) indicating that the data sets are locked for updates. In those scenarios where validation cop(ies) of data set(s) are maintained at the destination data store 620 (e.g., for a prior phase of migration), migration coordinator 440 may initiate the deletion of the validation cop(ies) of the data set(s) 646. Migration coordinator 440 may also provision a number of migration agents 450 to begin operations to copy the data sets from source data store 610 to destination data store 620. For example, migration coordinator 440 may assign different portions (e.g., different data objects in a data set) to different agents 450 so that those agents 450 may perform operations in parallel (reducing the time to migrate the data set(s). In some embodiments, migration coordination may delegate other tasks to migration agents 450 (e.g., the deletion of validation copies 646).

Migration agents 450 may periodically update the status the migration operations for the data sets by updating migration tracking 420. For migration failures or errors (e.g., due to a network or data store errors), migration agents 450 may update migration tracking to flag data sets for manual migration or investigation (e.g., by setting migration state to "PAUSED"). As illustrated in FIG. 6, migration agents 450 may also indicate migration completion 654 to migration tracking 420. Migration coordinator 440 may request (e.g., periodically poll) migration tracking 440 to get data set migration status 656. When migration coordinator 440 determines that migration operations for the data set(s) are complete, then migration coordinator may request validation 658 of the data sets by migration validation 430. Migration validation 430 may then get or access the data sets 660 in source data store 610 and get or access the data sets 662 in destination data store 620 to perform a validation of the copy of the data set in data store 620. For example, the number and/or values of data objects in the data set may be compared to determine whether or not the data sets match. Once migration validation 430 makes a validation decision, migration tracking 420 may be updated (e.g., an indication that the data set(s) are validated 664). Migration coordinator 440 which may be continuing to poll migration tracking 420 may get the validation results 666 and in response unlock the data set(s) 668 so that the data sets can be updated at destination data store 620. For example, the lock field or object in the data sets at source data store 610 may be changed to indicate that the data set is now available for updates in destination data store 620.

The provider network, data storage services, migration service and other services for which migration of mutable data stores and other techniques discussed in FIGS. 2 through 6 provide examples of migrating a data set that is mutable from a source data store to a destination data store. However, various other types of data stores, migration services, provider networks, or other systems, services, are components may implement migration of mutable data sets between data stores. Therefore, FIG. 7 is a high-level flowchart illustrating methods and techniques to migrate mutable data sets between data stores, according to some embodiments. Various different data stores and/or migration systems including the embodiments described above may implement the techniques described below.

A data store, as noted above, may be any system, service, or component that maintains data sets on behalf of clients of the data store (which may access the data store to update or read the data sets). Because the data sets may be accessed for updates at the data store, the data sets are considered mutable. Data sets may be one or more data objects or collections of data objects (e.g., files, folders, tables, volumes, pages, blocks, or other forms or formats of data including various data structures) which may be treated for migration purposes as an atomic unit. For instance, either the entire data set (e.g., all objects in the data set) is migrated and available at the destination data store, or none of the data set (e.g., none of the objects) is migrated and available at the destination data store.

A source data store may be a data store that maintains multiple data sets. For example, a source data store may serve as a storage backed for a network-based service, application, or site that accesses the data sets (or one of the data sets) in order to perform various operations (e.g., track use usage, provide content or functionality, etc.). As indicated at 710, some of the mutable data set(s) maintained in the source data store may be identified for migration to a destination data store. Continuing with the above example, the destination data store may offer different or more functionality for providing access to the data set for the service, application, or site, and thus migrating the data set(s) currently in the source data store to the destination data store may allow the service, application, or site to utilize the different or additional functionality of the destination data store. Because data set migration may be potentially disruptive to the performance of the clients accessing the data sets, only a portion (e.g., not all) data sets may be identified for migration at any one time. For example, in at least some embodiments, a mechanism may be implemented to ensure that only a certain number or percentage of data sets may be migrated at any one time. Migration of additional data sets may be delayed or postponed until the identified data set(s) are migrated (or flagged for manual migration as discussed below).

Migration operations or tasks may then be initiated for the identified data set(s). In at least some embodiments, updates to the data set(s) may be blocked, as indicated at 720. A lock, such as discussed above, or other blocking mechanism may be implemented to deny requests from clients change, modify, or affect the identified data set(s). For example, a black list, lock table, gate keeping component or other mechanism may implemented to identify requests to update those identified data set(s) and return an error indication (e.g., an HTTP 500 error indication). Or, the blocking mechanism may be enforced at the client (e.g., by reading a lock field or other indication include in the data set indicating that the data set is locked for updates). However, in at least some embodiments, read requests (or requests to obtain, get, or access the data set(s) without modifying the data set(s)) may be allowed so that clients experience little disruption during the performance of a migration. Combined with limiting the number of mutable data sets being migrated at a time, there is a low probability that a client will experience errors when accessing data sets in the source data store, as only a portion of data sets may be unavailable for update requests.

While update(s) to the data set(s) are blocked, operations to copy the data set(s) from the source data store to the destination data store may be performed, as indicated at 730. For example, a file transfer protocol that allows for direct communication between the data store(s) may be implemented to copy the data set(s) from the source data store to the destination data store. In some embodiments, a third party coordinator, such as the migration service discussed above, may be able to obtain the data set from the source data store and copy or store it in the destination data store. As indicated at 740, once copying of the data set(s) from the source data store to the destination data store are completed, the copies of the data sets may be validated, as indicated at

740. For example, the numbers of data objects and/or values of data objects stored in the copies of the data set(s) may be compared with the numbers of data objects and/or values of data objects stored in the data set(s) at the source data store. In some embodiments, digest values or other representations of the data sets may be calculated and compared with digest values for the copies of the data set(s) to determine if the copies of the data set(s) are valid.

As indicated by the negative exit from 740, for those copies of the data set(s) that are not determined to be valid, the data set(s) may be flagged, identified, tagged, or otherwise indicated for manual migration, as indicated at 742. For example, status or tracking data for migration operations may be updated to set the migration status for the data set(s) as "PAUSED" or "ERROR" so that notifications may be sent to the appropriate stake holders to investigate, troubleshoot, and/or perform manual migration of the data set(s). In some embodiments (not illustrated), updates to the flagged data set(s) may again be allowed at the source data store. The invalid copies of the data set(s) at the destination data store may be retained (e.g., for troubleshooting purposes) or deleted. As indicated by the positive exit from 740, for those copies of the data set(s) determined to be valid, updates may be allowed to the data set(s) at the destination data store, as indicated at 750. For instance, a notification or other communication may be made to client(s) to indicate that the data set(s) are now maintained in the destination data store. The blocking mechanisms may be removed or updated to redirect update requests to the destination data store.

As indicated at 760, unless all of the data set(s) at the data store have been migrated (excepting those data set(s) which may be flagged for manual migration) have been migrated, the techniques described above may be repeatedly performed until all data set(s) are migrated. For instance, the percentage cap or threshold on migrations may be increased or additional data set(s) selected for migration according to the techniques discussed above at element 710. In some embodiments, the same techniques may be performed to roll-back or reverse the migration by re-migrating data sets back from the destination data store to the source data store.

Figure 8:
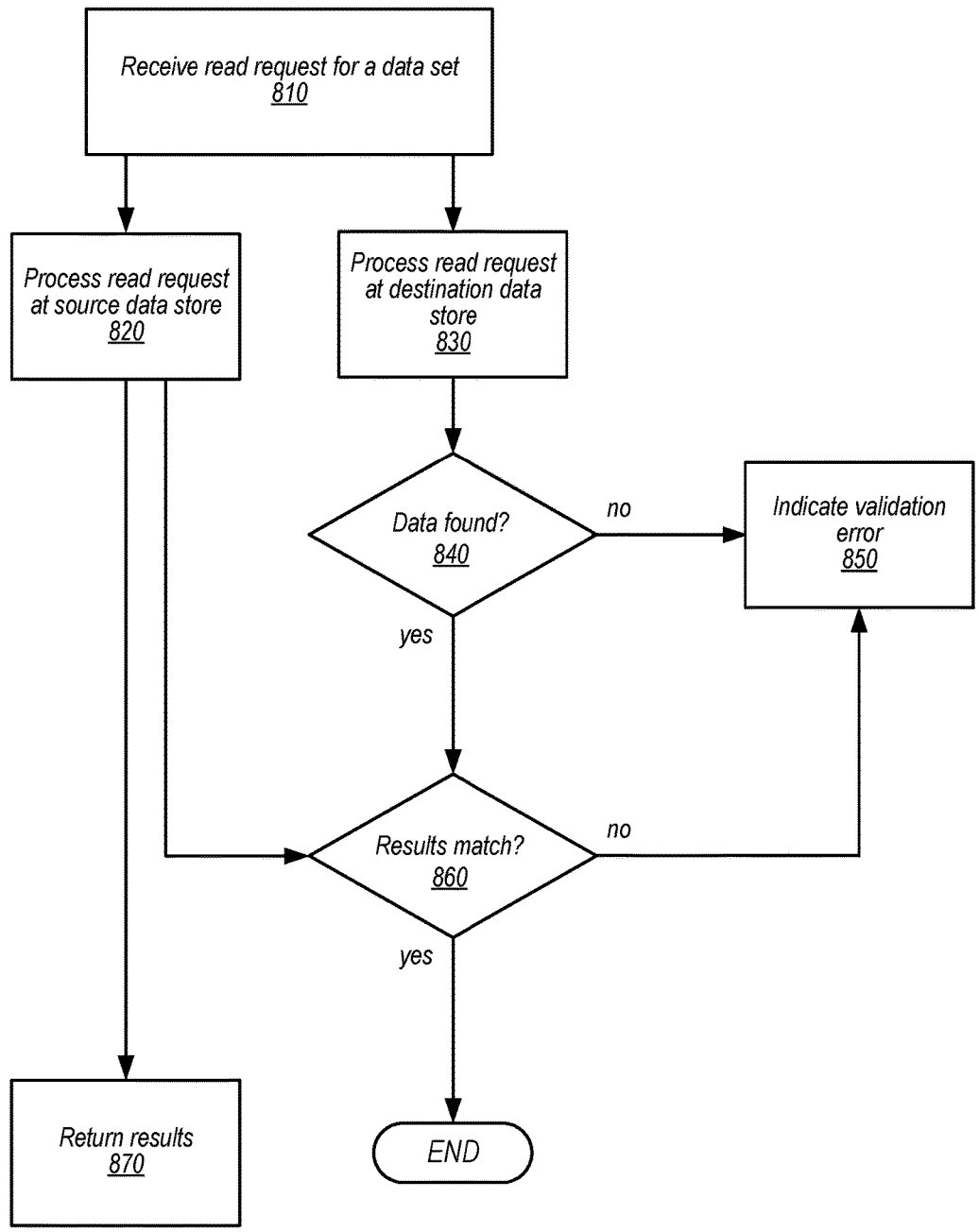
FIG. 8 is a high-level flowchart illustrating methods and techniques to validate a copy of a data set stored in a destination data store upon read requests, according to some embodiments

As discussed above with regard to FIG. 2, the migration of data sets from one data store to another may have unforeseen consequences in the operation of clients or the structure of the data set(s) when implementing a migration. Multiple phases, including the validation phase discussed above with regard to FIGS. 5A and 5B, that allows for client operations to continue at the source data store while the same operations are repeated for validation purposes at the destination data store, may provide insight into whether the migration of the data set(s) will be successful when performed according to the techniques discussed above with regard to FIG. 7. FIG. 8 is a high-level flowchart illustrating methods and techniques to validate a copy of a data set stored in a destination data store upon read requests received at the source data store, according to some embodiments.

As indicated at 810, a read request for a data set may be received. The data set identified by the read request may be in a validation phase before initiating migration of the data set, with a validation copy of the data set maintained at a destination data store. The client, however, may be unaware of the operation of the potential migration and may submit the read request for the data set as it would if no validation phase were ongoing. As indicated at 820, the read request may be processed at the source data store, in various embodiments. For example, a storage or query processing engine at the source data store may parse the read request, identify portion(s) of the data set to access, and generate a result in accordance with the accessed data. As the validation phase is non-disruptive for clients, the results from processing the read request at the source data store are returned, as indicated at 870, whether or not validation errors are detected.

In order to assess the performance destination data store, the read request may also be processed at the destination data store, as indicated at 830. For example, a different storage or query processing engine at the destination data store may parse the read request, identify portion(s) of the data set to access, and generate a result in accordance with the accessed data. If data specified in the read request is not found in the validation copy, as indicated by the negative exit from 840, then a validation error may be indicated, as indicated at 850. For example, if the destination data store were to return an error or other notification that a specified data object (e.g., database table) is not found in the destination data store, then a validation error indicating that the data was not found may be indicated. The validation error may be sent to a tracking, auditing, or other validation system (e.g., migration validation 430 in FIG. 4) that monitors whether the validation copy in the data set provides consistent or expected behavior if the migration of the data set were to be performed. Even if a result is generated at 830, then as indicated at 860, a determination may also be performed as to whether the results generated by the source data store and the destination data store match, in various embodiments. If so, then no validation error may be recorded. However, if the results do not match (e.g., data values are different, missing, etc.) then a validation error may be indicated, as indicated at 850. For example, the validation error may indicate that the results do not match and may include the contents of the results generated by the destination data store (e.g., for further troubleshooting or analysis).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the services/systems described herein). The various methods as illustrated in the figures and described herein represent example embodiments of methods. The order of any method may be changed, and various elements may be added, reordered, combined, omitted, modified, etc.

Figure 9:
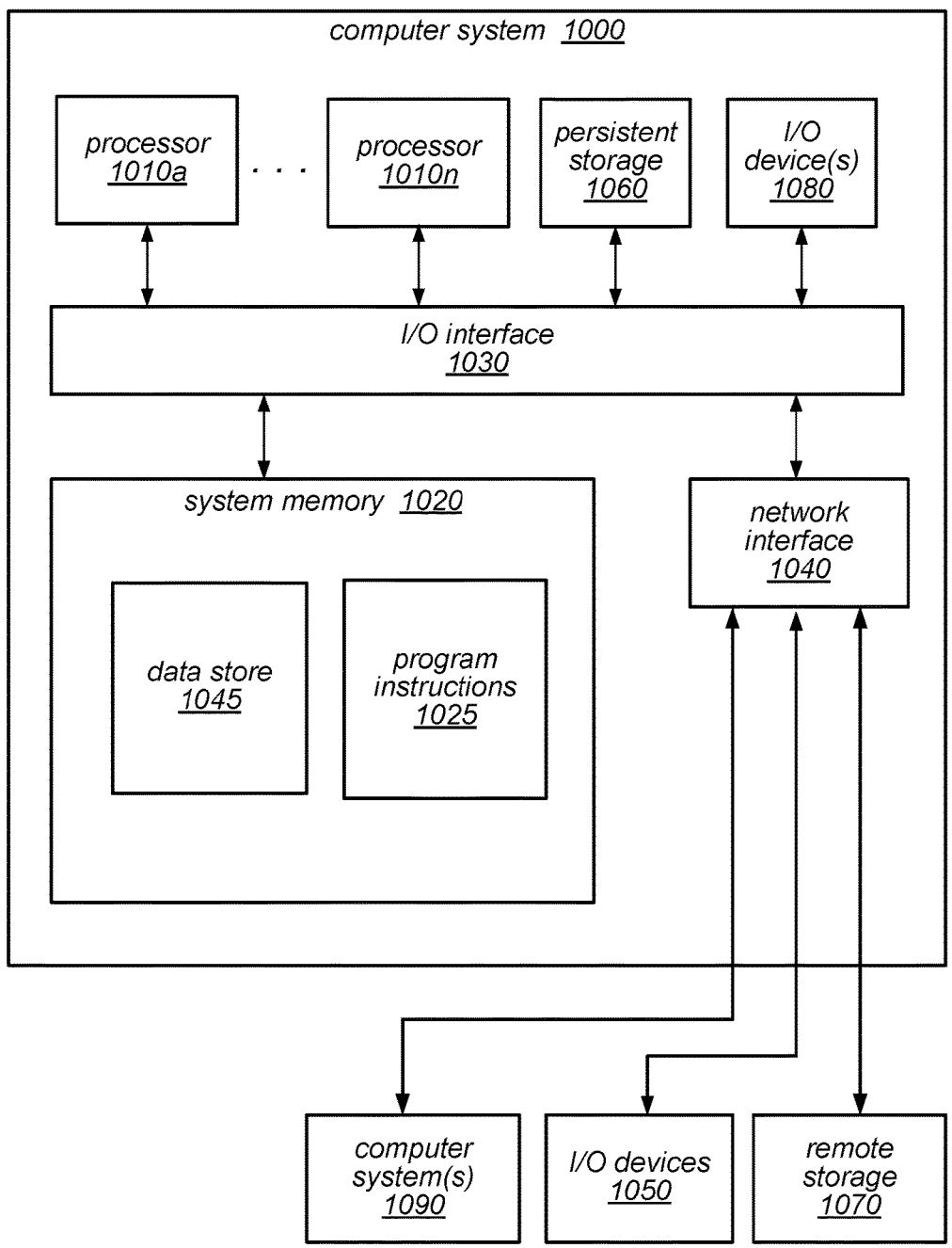
FIG. 9 is an example computer system, according to various embodiments.

FIG. 9 is a block diagram illustrating a computer system configured to implement migration of mutable data sets between data stores, according to various embodiments, as well as various other systems, components, services or devices described above. For example, computer system 1000 may be configured to implement access nodes, log stores, or other data store components, such as a migration coordinator, for implementing live migration of log-based consistency mechanisms for data stores, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the directory storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a migration service, data store, or clients of a data store, in different embodiments.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement embodiments described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more compute nodes, comprising at least one processor and a memory, configured to implement a migration coordinator;
the migration coordinator, configured to:
determine one of a plurality of data sets maintained in a source data store for migration to a destination data store, wherein the plurality of data sets are mutable at the source data store;
create a validation copy of the one data set at the destination data store;
after comparing performance of the validation copy at the destination data store with the one data set at the source data store for a request directed to the one data set, direct migration of the one data set from the source data store to the destination data store, wherein to direct the migration the migration coordinator is configured to:
lock the one data set at the source data store to prevent updates to data in the one data set;
copy the data in the one data set from the source data store to the destination data store;
upon completion of the copying:
unlock the one data set at the source data store to re-direct updates to the one data set at the destination data store such that the data in the one data set is mutable at the destination data store; and
wherein the one data set is available for reads at the source data store during the migration.

2. The system of claim 1,
wherein to direct the migration of the one data set, the migration coordinator is further configured to validate the copy of the one data set in the destination data store with the one data set in the source data store to determine that the copy of the one data set is consistent with the one data set; and
wherein the unlock of the one data set at the source data store to re-direct updates to the data set at the destination data store is further performed upon the determination that the copy of the one data set is consistent.

3. The system of claim 1, wherein to compare the performance of the validation copy at the destination data store with the one data set at the source data store for the request directed to the one data set, the migration coordinator is configured to:
replicate the request directed to the one data set at the validation copy of the data set; and
generate a validation result based, at least in part, on the replication of the request.

4. The system of claim 1, wherein the migration coordinator, the source data store, and the destination data store are implemented as different respective services of a provider network, and wherein the plurality of data sets are maintained on behalf of another service of the provider network.

5. A method, comprising:
performing, by one or more computing devices:
identifying one data set of a plurality of data sets maintained in a source data store for migration to a destination data store, wherein the plurality of data sets are mutable at the source data store;
creating a validation copy of the one data set at the destination data store;
after comparing performance of the validation copy at the destination data store with the one data set at the source data store for a request directed to the one data set, migrating the one data set from the source data store to the destination data store, comprising:
blocking updates to data in the one data set at the source data store;
copying the data in the data set from the source data store to the destination data store;
upon completion of the copying, allowing updates to the data in the one data set at the destination data store such that the one data set is mutable at the destination data store; and
wherein the one data set is available for reads at the source data store during the migrating.

6. The method of claim 1,
wherein migrating the one data set further comprises validating the copy of the one data set in the destination data store with the one data set in the source data store to determine that the copy of the one data set is consistent with the one data set; and
wherein the allowing of the updates to the one data set at the destination data store is further performed upon the determination that the copy of the one data set is consistent.

7. The method of claim 5,
wherein blocking updates to the one data set at the source data store comprises writing a lock indication into the one data set that indicates that updates to the one data set are not allowed upon accessing the one data set; and
wherein allowing the updates to the one data set comprises modifying the lock indication to direct updates to the destination data store.

8. The method of claim 5, wherein comparing performance of the validation copy at the destination data store with the one data set at the source data store for the request directed to the one data set comprises:
replicating the request directed to the one data set at the source data store at the validation copy of the one data set; and
generating a validation result based, at least in part, on the replication of the request.

9. The method of claim 8, wherein the request is an update to the one data set, and wherein replicating the request directed to the one data set at the source data store at the validation copy of the one data set comprises:
maintaining the update to the one data set in a queue; and
applying the update to the validation copy at the destination data store from the queue when the update is identified as committed to the one data set at the source data store.

10. The method of claim 8, further comprising:
evaluating the validation result to detect a migration event; and
wherein the identifying and the migrating are performed in response to detecting the migration event.

11. The method of claim 5, wherein identifying the one 49-F mom data set comprises identifying data sets within a threshold number of data set migrations allowed.

12. The method of claim 5, further comprising repeatedly performing the identifying and the migrating until the plurality of data sets are migrated from the source data store to the destination data store.

13. The method of claim 5, wherein copying the one data set from the source data store to the destination data store comprises copying different portions of the one data set in parallel from the source data store to the destination data store.

14. A non-transitory, computer-readable storage medium, storing program instructions that when executed by one or more computing devices cause the one or more computing devices to implement:
determining one data set of a plurality of data sets maintained in a source data store for migration to a destination data store, wherein the plurality of data sets are mutable at the source data store;
creating a validation copy of the one data set at the destination data store;
after comparing performance of the validation copy at the destination data store with the one data set at the source data store for a request directed to the one data set, migrating the one data set from the source data store to the destination data store, wherein, in migrating the one data set, the program instructions cause the one or more computing devices to implement:
blocking updates to data in the one data set at the source data store;
copying the data in the one data set from the source data store to the destination data store;
upon completion of the copying, redirecting updates to the data in the one data set at the destination data store such that the data in the one data set is mutable at the destination data store; and
wherein the one data set is available for reads at the source data store during the migrating.

15. The non-transitory, computer-readable storage medium of claim 14,
wherein, in migrating the one data set, the program instructions cause the one or more computing devices to further implement validating the copy of the one data set in the destination data store with the data set in the source data store to determine that the copy of the one data set is consistent with the one data set; and
wherein the redirecting of the copying is further performed upon the determination that the copy of the one data set is consistent.

16. The non-transitory, computer-readable storage medium of claim 14,
wherein the program instructions cause the one or more computing devices to implement performing the migrating for another one of the plurality of data sets determined for migration, wherein the validating of the other data set determines that the copy of the other data set is not consistent with the other data set; and
wherein the program instructions cause the one or more computing devices to further implement:
in response to the determination that the copy of the other data set is not consistent with the other data set, identifying the other data set for manual migration.

17. The non-transitory, computer-readable storage medium of claim 14, wherein, in copying the data in the one data set from the source data store to the destination data store, the program instructions cause the one or more computing devices to implement copying different portions of the one data set in parallel from the source data store to the destination data store.

18. The non-transitory, computer-readable storage medium of claim 14, wherein in comparing performance of the validation copy at the destination data store with the one data set at the source data store for the request directed to the one data set, the program instructions cause the one or more computing devices to implement:
- replicating the request directed to the one data set at the source data store at the validation copy of the one data set; and
- generating a validation result based, at least in part, on the replication of the request.

19. The non-transitory, computer-readable storage medium of claim 14, wherein the source data store is a different type of data store than the destination data store.

20. The non-transitory, computer-readable storage medium of claim 14, wherein the source data store and the destination data store are implemented as different respective services of a provider network, and wherein the plurality of data sets are maintained on behalf of another service of the provider network.

* * * * *